J. R. VALDES.
RESILIENT TIRE.
APPLICATION FILED NOV. 27, 1916.
1,292,161. Patented Jan. 21, 1919.
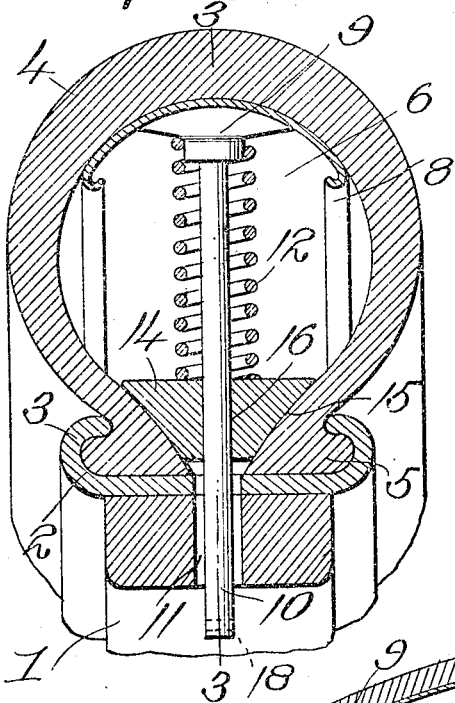
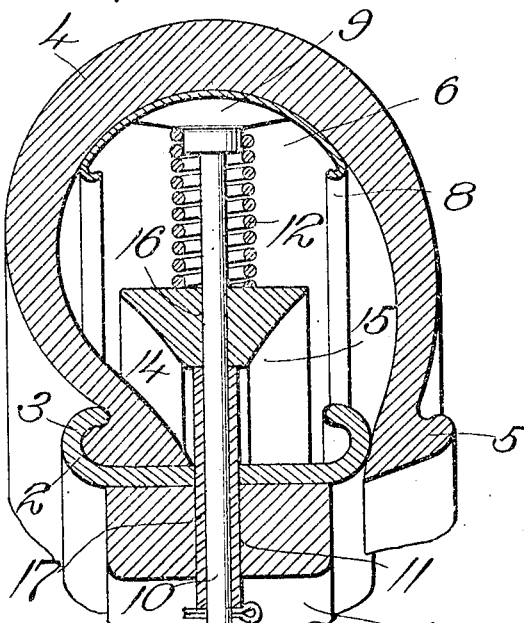
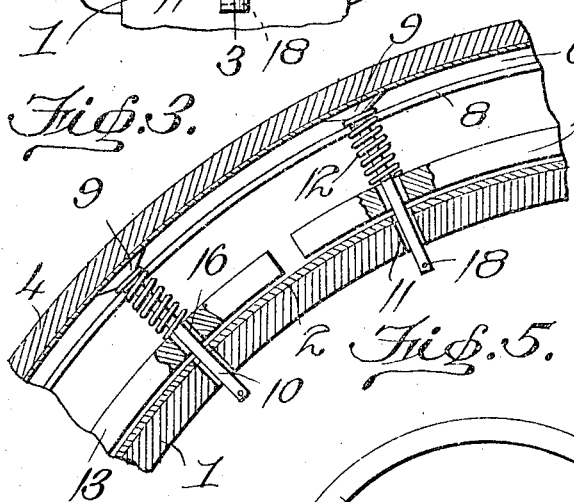
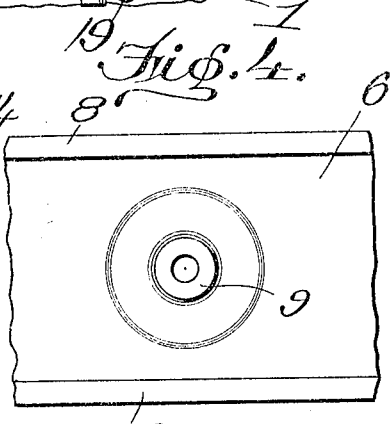
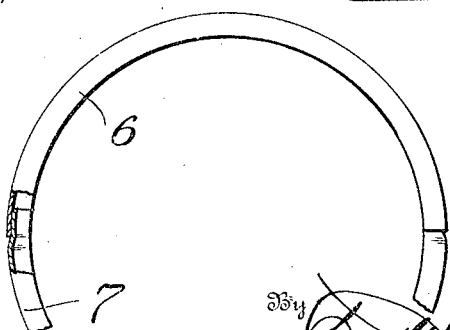
Witnesses
Inventor
J. R. Valdes,
By
Attorney

UNITED STATES PATENT OFFICE.

JOSE R. VALDES, OF KEY WEST, FLORIDA.

RESILIENT TIRE.

1,292,161.  Specification of Letters Patent. Patented Jan. 21, 1919.

Application filed November 27, 1916. Serial No. 133,679.

*To all whom it may concern:*

Be it known that I, JOSE R. VALDES, a citizen of the United States, residing at Key West, in the county of Monroe, State of Florida, have invented certain new and useful Improvements in Resilient Tires; and I do hereby declare the following to be a full, clear, and exact description of the invention, such as will enable others skilled in the art to which it appertains to make and use the same.

The invention relates to resilient tires and more particularly to resilient tire structures in which spring elements are employed to expand the tread surface.

The object of the invention is primarily to provide an automobile tire in which springs are employed as a substitute for air and in which furthermore, the springs act to lock the tire upon its rim. To this end, the invention consists, in the combination with a rim and a tire shoe or casing, of a sectional ring fitted against the inner surface of the tread portion of the tire a sectional ring bearing against the wheel rim and shaped to lock the clencher beads of the tire in position, and spring elements interposed between the two sectional rings to position them.

A further object of the invention consists in a peculiar arrangement of the parts above described whereby the inner ring may be expanded and removed from contact with the clencher beads of the tire in order to permit the ready removal of the latter from the wheel.

With the above objects in view and such other objects as will hereinafter appear my invention will now be fully set forth and described, reference being had to the accompanying drawings:—

In the drawings:—

Figure 1 is a transverse section of a tire built according to my invention,

Fig. 2 is a similar section showing the parts in position to be removed,

Fig. 3 is a section on line 3—3 of Fig. 1,

Fig. 4 is a plan view of one of the elements forming a part of the outer ring, and Fig. 5 is an elevation of the outer ring sections as they are assembled, parts being broken away.

Referring more particularly to the drawings, 1 indicates the felly of an automobile wheel of the usual construction upon which is mounted the clencher rim 2 having the overturned clencher flanges 3. A tire casing 4 which may be of any ordinary manufacture is provided with the clencher beads 5 which are adapted to engage with the clencher flanges 3 in order to hold the tire in place.

Bearing against the inner surface of the tread portion of the tire casing 4 is a steel ring consisting of the sections 6 and 7, each of the sections being slightly longer than a half circle in order that they may overlap when brought together to constitute a complete annulus around the inside of the tire casing 4. Preferably the sections 6 and 7 are made of steel and have their marginal edges rolled inwardly as at 8 in order to avoid any possible cutting action or wearing action upon the tire. Mounted upon the inner surfaces of the sections 6 and 7 is a series of blocks or castings 9 which are located in suitably spaced relation and are centrally and radially socketed and threaded to receive the threaded ends of radially extended plunger rods or stems 10. The rods or stems 10 are of sufficient length so that when their outer ends are secured in the blocks 9, their opposite ends will extend through and beyond the bored apertures 11 which extend through the rim 2 and the felly 1. The stems 10 project freely through the openings 11 in order that the tire may properly flex under traction pressure. Mounted upon the stems 10 and having their outer ends seated upon the blocks 9 are the coil springs 12, the blocks 9 being suitably tapered and shaped to provide circular seats for the springs. The inner ends of the springs 12 bear against the sections 13 and 14 of an inner ring also mounted upon the stems 10. The sections 13 and 14 consist of wooden semi-circular elements having in cross section, a wedge-shaped contour so as to provide the bearing faces 15 which act against the clencher beads 5 and place them into engagement with the clencher flanges 3. As above stated the sections 13 and 14 are constructed of shaped wood so as to possess a certain degree of expansive resilience and are furthermore mounted upon the stems 10 by means of longitudinal slots 16 through which the stems project and have a certain amount of longitudinal play. Thus, the springs 12 acting between the ring sections 6 and 7 and the ring sections 13 and 14 maintain the tire casing 4 in a proper state of resilient expansion or extension, and furthermore cause the ring sections 13 and 14 to lock the clencher beads 5 in locked engagement with the rim 2.

In order to permit the ring sections 13 and 14 to be removed from contact with the clencher beads 5, a suitable plurality of tubular sleeves 17 is provided and are of such length as to be slipped over the free ends of the stems 10 and forced into contact with the ring sections 13 and 14, the openings 11 being of such diameter as to receive the tubular sleeves 17. By placing the sleeves 17 over the stems 10 and forcing them inwardly against the sections 13 and 14, the latter are expanded and lifted out of contact with the clencher beads, the outer ends of the stems being provided with transverse apertures 18 through which the cotter pins or other suitable devices 19 may be projected in order to lock the inner ring sections out of engagement with the clencher beads 5 thereby permitting the removal or other manipulation of the tire casing 4. It is obvious that the expansive resilience of the widened ring sections 13 and 14 together with the slotted engagement of the latter with the stems 10 permits the proper lifting of the inner ring sections 13 and 14 out of engagement with the clencher beads.

The operation of my improved construction is obvious from the foregoing, and the various functions of the springs and rings have also been clearly brought out, but it should be particularly noted that the coöperation of the parts is such that with any increase of pressure upon the tread surface of the tire casing, the clencher beads are more firmly pressed into place, and also, that the spring expansion ring is held in position without the use of locking bolts or other particular securing devices and depends entirely upon the resilience of the springs for the positioning of the parts as well as the resilience of the tire.

What I claim as my invention is:—

The combination with a wheel felly and rim provided with a series of openings therethrough and a tire casing having a clencher engagement with the rim, of a sectional ring bearing against the inner surface of the casing, a second sectional ring bearing against the clencher portions of the tire casing and locking the latter into engagement with the rim, said ring being provided with a series of openings therethrough in alinement with the openings of the felly and rim, stems secured to the first sectional ring and extending freely through the latter and the wheel rim and felly and spring elements surrounding the stems and bearing between the sectional rings to seat both of the latter, the second sectional ring being movable toward the first sectional ring to release the casing, the openings of the felly and rim being greater in diameter than the openings of the second sectional ring to permit insertion of sleeves through said openings for engagement with said second sectional ring to procure such movement of the ring.

In testimony whereof, I affix my signature, in the presence of two witnesses.

JOSE R. VALDES.

Witnesses:
CHAS. J. CURRY,
WALLACE PINDER.

Copies of this patent may be obtained for five cents each, by addressing the "Commissioner of Patents, Washington, D. C."